(12) United States Patent
Kuppuswamy et al.

(10) Patent No.: US 9,014,176 B2
(45) Date of Patent: Apr. 21, 2015

(54) METHOD AND APPARATUS FOR CONTROLLING THE ACCESS OF A USER TO A SERVICE PROVIDED IN A DATA NETWORK

(75) Inventors: Raja Kuppuswamy, Munich (DE); Marc Mumm, Munich (DE)

(73) Assignee: Voicetrust Eservices Canada Inc, Montreal (CA)

(*) Notice: Subject to any disclaimer, the term of this patent is extended or adjusted under 35 U.S.C. 154(b) by 1142 days.

(21) Appl. No.: 12/593,385

(22) PCT Filed: Mar. 25, 2008

(86) PCT No.: PCT/EP2008/053468
§ 371 (c)(1),
(2), (4) Date: Feb. 19, 2010

(87) PCT Pub. No.: WO2008/116858
PCT Pub. Date: Oct. 2, 2008

(65) Prior Publication Data
US 2010/0165981 A1    Jul. 1, 2010

(30) Foreign Application Priority Data
Mar. 26, 2007   (DE) .......................... 10 2007 014 885

(51) Int. Cl.
| H04L 12/66 | (2006.01) |
| H04L 29/06 | (2006.01) |
| H04M 3/38 | (2006.01) |
| H04M 3/493 | (2006.01) |

(52) U.S. Cl.
CPC ............. *H04L 63/0861* (2013.01); *H04M 3/38* (2013.01); *H04M 3/493* (2013.01); *H04M 2201/41* (2013.01)

(58) Field of Classification Search
None
See application file for complete search history.

(56) References Cited

U.S. PATENT DOCUMENTS

| 5,913,196 | A | 6/1999 | Talmor et al. | |
| 2002/0181691 | A1* | 12/2002 | Miller et al. | 379/234 |
| 2002/0194003 | A1 | 12/2002 | Mozer | |
| 2003/0031138 | A1 | 2/2003 | Beckwith | |
| 2003/0046083 | A1 | 3/2003 | Devinney, Jr. et al. | |
| 2003/0125947 | A1 | 7/2003 | Yudkowski | |
| 2006/0034287 | A1 | 2/2006 | Novack et al. | |
| 2007/0280211 | A1* | 12/2007 | Malueg et al. | 370/356 |
| 2008/0015859 | A1* | 1/2008 | Novack et al. | 704/246 |

FOREIGN PATENT DOCUMENTS

EP           1150453          2/2006

* cited by examiner

*Primary Examiner* — Minh-Trang Nguyen
(74) *Attorney, Agent, or Firm* — Volpe and Koenig, P.C.

(57) ABSTRACT

Process for controlling the access of a user to a service provided in a data network, to protect user data stored in a data base of the service from unauthorized access, the method comprising: (a) inputting, in a VoIP session, a voice sample of the user at a user data terminal which is at least temporarily connected to the data network, (b) processing, in a first processing step, the user's voice sample using a dedicated client implemented at the user data terminal, to obtain a pre-processed voice sample or a current voice profile of the user, (c) further processing, in a second processing step, the pre-processed voice sample or the current voice profile, including a comparison step of the current voice profile with an initial voice profile stored in a data base, and (d) outputting an access control signal for granting or rejecting access to the service, taking the result of the comparison step into account.

17 Claims, 3 Drawing Sheets

METHOD AND APPARATUS FOR CONTROLLING THE ACCESS OF A USER TO A SERVICE PROVIDED IN A DATA NETWORK

BACKGROUND

This invention refers to a process and an apparatus for controlling the access of a user to a service provided in a data network.

In conventional access control systems, as applied to data networks, identification or authentication means, respectively, of the knowledge-based type are being used to fulfil the security requirements. In particular, for decades password-based or PIN based identification/authentication schemes are known and generally used. More specifically, in spy- or fraud-sensitive applications, such as home banking applications, supplementary security measures like the provision and obligatory use of individual transaction codes or TANs, respectively, are known and widely used. Even such supplementary security-enhancing schemes are knowledge based and suffer, therefore, from the typical disadvantages of all knowledge based schemes, i.e. problems related to the loss of the relevant information by the authorised user on one hand and risk arising from the access to such information by an unauthorized user on the other hand.

Therefore, in recent years considerable efforts have been made to include other types of identification/authentication schemes into the security mechanisms of data networks. In particular, approaches to add "possession-based" (tokens) and/or "being-based" (biometry-based) mechanisms to the well-known knowledge-based mechanisms have been tried. For example, in automatic cash dispensers biometrical authentication schemes based on fingerprint or retina recognition, respectively, have been proposed, for controlling the access to bank accounts. Furthermore, the meanwhile well-established fingerprint-based access control means of notebooks and other personal computers should be mentioned as some kind of means for controlling the access to data networks.

More recently, voice-based authentication solutions, as a specific type of biometry-based identifications/authentications, are widely introduced by firms to supplement their internal knowledge-based access control schemes.

In internet and mobile based services and activities, in particular in internet market places like ebay or internet financial transaction systems like PayPal, with the rapidly growing worldwide user base the number of fraudulent attacks increases significantly. The probability of a successful attack on accounts of a worldwide internet-based service with millions of users is much higher than with phishing attacks on local banks.

Meanwhile, system providers like PayPal and ebay have reacted on the increasing number of attacks by introducing a hard token as a second layer of security for users' accounts. In recently developed solutions of this type, an individual security code which is periodically generated is supposed to protect the user against fraudulent abuse of his/her personal account.

These recently developed schemes suffer from an additional cost burden which is to be borne by the providers and/or users and from the typical disadvantages of possession-based identification/authentication means.

SUMMARY

It is an object of the invention to provide an improved process and apparatus for controlling the access of a user to a service provided in a data network which is, in particular, relatively easy to implement and acceptable under cost aspects.

This object is, under process aspects, solved by a process according to the invention and, under device aspects, by an arrangement according to the invention. Preferred embodiments of the invention are described below.

Accordingly, with the invention a process is provided which comprises (a) inputting, in a VoIP session, a voice sample of the user at a user data terminal which is at least temporarily connected to the data network, (b) processing, in a first processing step, the user's voice sample using a dedicated client implemented at the user data terminal, to obtain a pre-processed voice sample or a current voice profile of the user, (c) further processing, in a second processing step, the pre-processed voice sample or the current voice profile, including a comparison step of the current voice profile with an initial voice profile stored in a data base, and (d) outputting an access control signal for granting or rejecting access to the service, taking the result of the comparison step into account.

In other words, the invention suggests that a special client be installed on the user's computer using voice biometrics to authenticate the user. The client securely ensures the identity of the user without demanding the user to keep in mind numerous complex passwords and without the danger of being a victim of fraud attacks.

As a generic authentication tool, the process can serve as a second factor authentication to increase the level of security and to support existing conventional authentication methods, like password or PIN based methods. Alternatively, the inventive process can act as a secure two-factor authentication method itself based on voice recognition and voice authentication, without the need to use passwords or PINs or additional hardware at all. In this regard, both embodiments are addressing existing market segments and can result in cost savings and an increase of users' convenience.

All in all, the method provides significant benefit to all parties involved in critical transactions and data access procedures. In particular, no additional hardware or software is required on the user's side. The user acceptance is deemed to be high, since the process is easy-to-use, safe and secure. As far as the provider's side is concerned, no hardware intensive rollout of tokens and smartcards is necessary, and a fast and easy to implement central security administration becomes possible. Furthermore, the easily achievable scalability of the process makes it an ideal solution for mass-market online access applications in many areas. It is, basically, suitable for any client-server and peer-to-peer based transaction.

In an embodiment of the invention, the method steps (a) to (d) are substantially carried out at the user data terminal and the access control signal is transmitted to a server of the service via the data network.

In a further embodiment, after step (b) the pre-processed voice sample or the voice profile is transmitted to a voice authentication server via the data network, the second processing step (c) is carried out at the authentication server, and the authentication server outputs the access control signal to a server of the service.

In a further embodiment, supplementary to the steps (a) to (d), forming a first authentication procedure, a second authentication procedure is carried out and the access control signal is generated in response to respective output signals of the first and second authentication procedures. Specifically, herein the second authentication procedure is password or user-ID based. More specifically, as an embodiment of the two-factor authentication mentioned further above, a password or user-ID spoken by the user is pre-processed by means of speech recognition.

In the most important protocol implementation, the data network is an internet protocol network and the client at the user terminal comprises a SIP client for call setup. More specifically, the SIP client is combined with an Interactive Connectivity Establishment (ICE) element or an Application Layer Gateway (ALG), for providing network address translation means. Typically, an URI is dedicated to the user data terminal for establishing the VoIP session, and the URI is used to address the authentication server.

Furthermore, in an embodiment of high future prospects, the data network is a mobile network, and a mobile terminal is used as the user data terminal.

As typically used for VoIP transmissions, for the voice data transmission to the authentication server the Realtime Transport Protocol (RTP) is used.

Alternatively to the use of an SIP client, the client at the user terminal comprises a STUN client, although at the present stage of knowledge such client may have some drawbacks, compared to the SIP client.

In a further embodiment of the invention, the first processing step (b) comprises voice quality processing and/or voice quality enhancement steps. Such steps per se are well-known in the art.

Most of the above-specified preferred aspects of the inventive process also have a counterpart in product or device features, respectively, of the invention. In so far, not all those aspects will be explained here in detail.

However, it shall be pointed out that in a preferred embodiment the apparatus or arrangement, respectively, comprises supplementary authentication means providing an output signal which is input into the access control generation means, for being processed together with the output signal of the comparator means. More specifically, the second authentication means is substantially implemented at the user data terminal or distributed over the user data terminal and the authentication server.

In a further embodiment of the arrangement, the first or second processing means comprises voice quality processing means and/or voice quality enhancement means. In a further advantageous implementation, according to the above-mentioned two-factor authentication system, the supplementary authentication means comprises speech recognition means for recognizing a password or user-ID, based on a speech input by the user.

BRIEF DESCRIPTION OF THE DRAWINGS

Preferred embodiments and advantages of the invention are described in more detail below, referring to the figures of the drawing. Herein.

DETAILED DESCRIPTION OF THE PREFERRED EMBODIMENTS

Basically, the figures are self-explaining, due to their inherent descriptive parts. Therefore, just as a brief comment thereto we would like to point out what follows.

Figure 1:
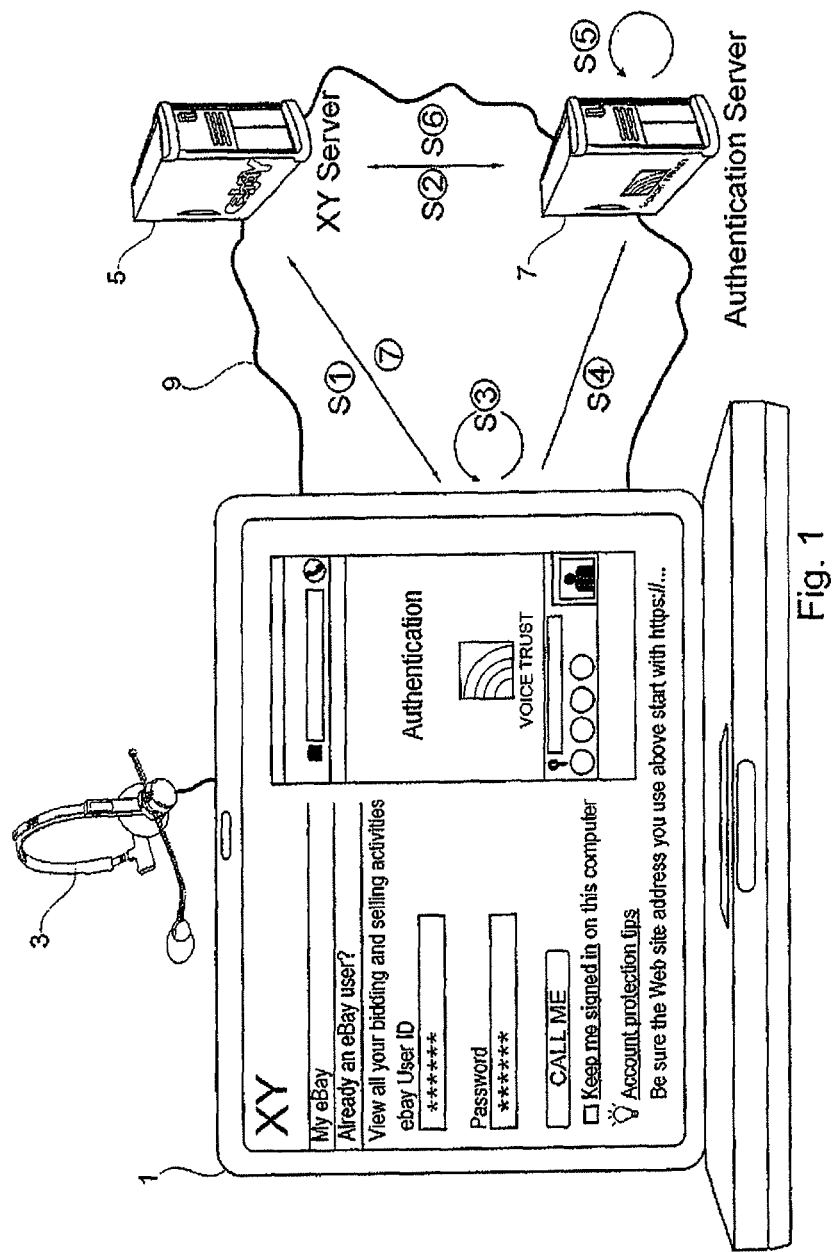
FIG. 1 shows a simplified diagram of an embodiment of the overall configuration according to the invention, FIG. 2 an SIP client architecture, according to an embodiment of the invention, and FIG. 3 an SIP server architecture, according to a further preferred embodiment of the invention.

According to FIG. 1, the arrangement to implement the invention comprises a notebook (user terminal) 1 to which a headset 3 is connected, a provider server ("XY Server") 5, and an authentication server 7, both of which are connected to the notebook 1 via a data network 9.

In a first step S1, a user wants to sign on an account with the provider XY, entering his user-ID (and password) and pressing a "Call Me" button which appears at the screen of his notebook. Turns this first authentication step out as being successful, in a second step S2 the user information is transferred from the XY server 5 to the authentication server 7. Meanwhile, a "soft token" on the user terminal is activated and calls the user, in a step S3.

In response thereto, the user provides some voice samples to verify his identity by means of a voice authentication method (known as such), and in step S4 the voice profile are transmitted to the authentication server 7. In a subsequent step S5, the authentication server compares the current voice sample to a stored "voice print", i.e. a voice profile of the user which formerly had been obtained during an enrolment procedure and stored within a data base of the authentication server. Has the second authentication step (voice profile comparison) been successful, in a step S6 a corresponding information is transmitted from the authentication server to the XY Server. In a final step S7, in response thereto, the requested access to the user account is granted, via the XY server 5.

Figure 2:
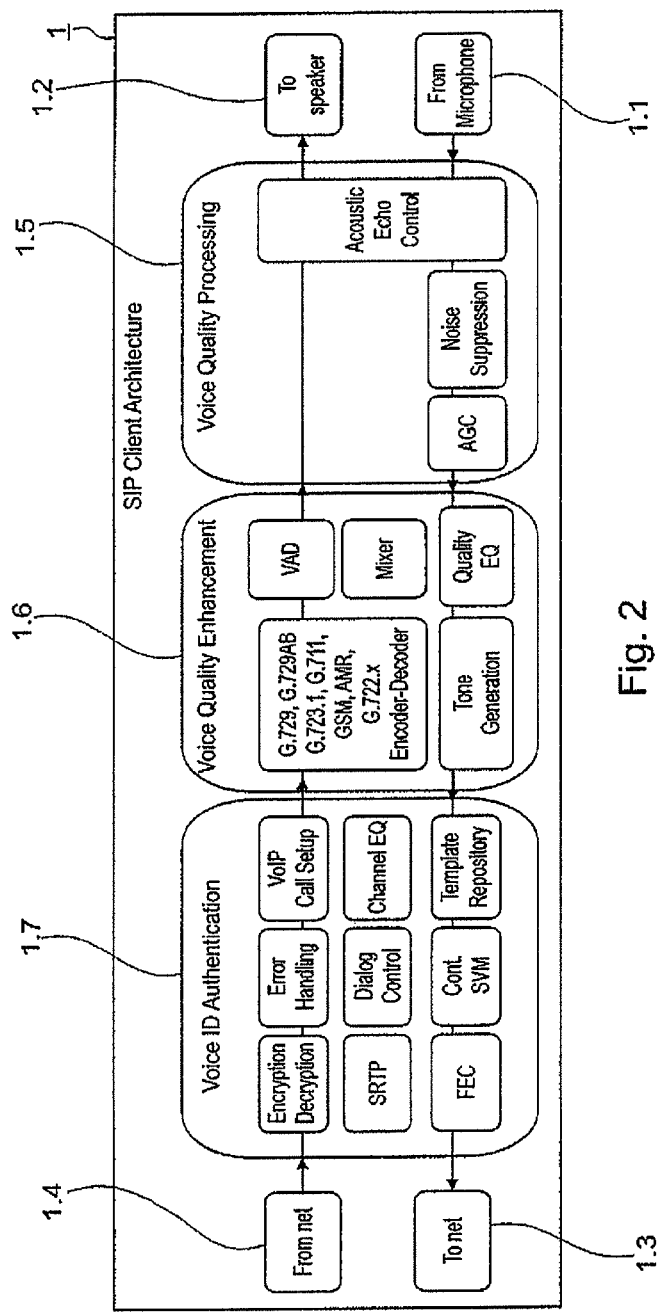

FIG. 2 schematically shows those functional components of a user terminal in an SIP client architecture, which are related to the implementation of an embodiment of the invention. In this embodiment, basically the whole voice profile-based authentication procedure is run within the client, including voice verification. As shown in FIG. 2, the user terminal 1 comprises several interfaces, i.e. a microphone interface 1.1 and a speaker interface 1.2 on the one hand and a network output interface 1.3 and a network input interface 1.4 on the other hand. Between the interfaces 1.1/1.2 on the one hand and the interfaces 1.3/1.4 on the other, voice quality processing means 1.5, voice quality enhancement means 1.6, and voice ID authentication means 1.7 are connected, with the respective internal structure as shown in the figure.

Figure 3:
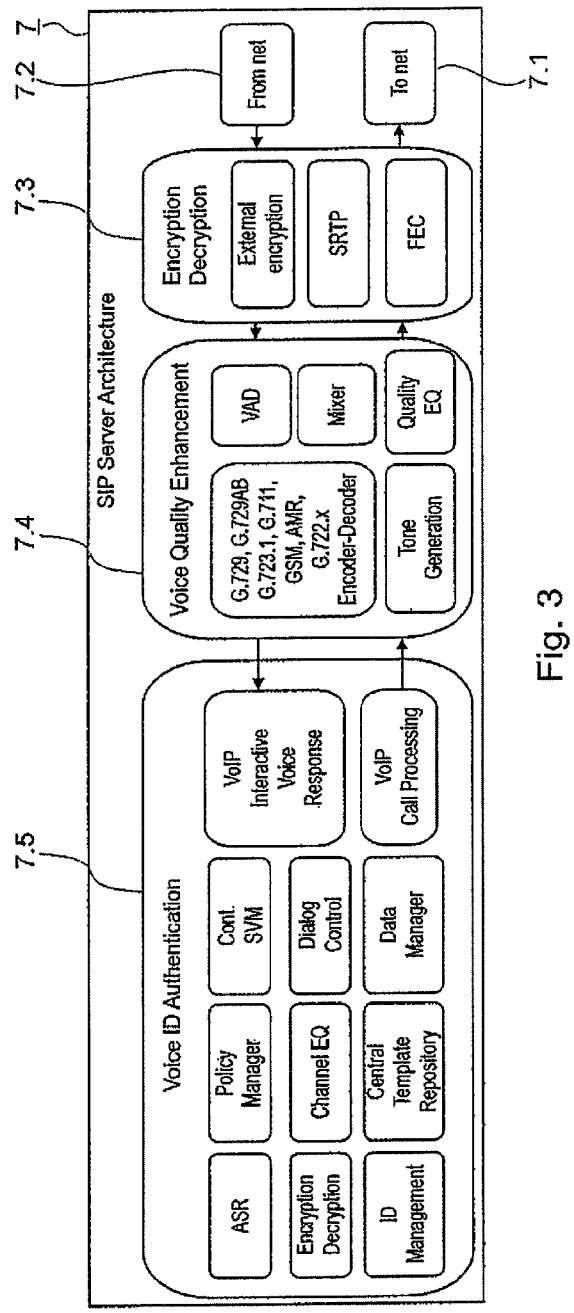

In FIG. 3 the main components of an authentication server are shown, in an architecture serving for centrally implementing the voice verification one the central server. In such embodiment, the client (implemented on the user terminal) only serves to handle the call. The architecture of the server 7, as shown in FIG. 3, comprises a network output interface 7.1 and a network input interface 7.3, as well as encryption/decryption means 7.3, voice quality enhancement means 7.4, and voice ID authentication means 7.5, the respective internal structure of which may be derived from the figure.

The invention claimed is:

1. Process for controlling the access of a user to a service provided in a data network, to protect user data stored in a data base of the service from unauthorized access, the method comprising:
   (a) inputting, in a VoIP session, a voice sample of the user at a user data terminal which is at least temporarily connected to the data network,
   (b) processing, in a first processing step, the user's voice sample using a dedicated client implemented at the user data terminal, to obtain a pre-processed voice biometric sample or a current voice profile of the user,
   (c) further processing, in a second processing step, the pre-processed voice biometric sample or the current voice biometric profile, including a comparison step of the current voice biometric profile with an initial voice biometric profile stored in a data base, (d) outputting an access control signal for granting or rejecting access to the service, taking into account a result of the comparison step, and after step (b) the pre-processed voice biometric sample or the voice profile is transmitted to a voice authentication server via the data network, the second processing step (c) is carried out at the authentication server, and the authentication server outputs the access control signal to a server of the service.

2. Process according to claim 1, wherein supplementary to the steps (a) to (d), forming a first authentication procedure, a second authentication procedure is carried out and the access control signal is generated in response to respective output signals of the first and second authentication procedures.

3. Process according to claim 2, wherein the second authentication procedure is password or user-ID based.

4. Process according to claim 1, wherein the data network is an internet protocol network and the client at the user terminal comprises a SIP client for call setup.

5. Process according to claim 4, wherein the SIP client is combined with an Interactive Connectivity Establishment element or an Application Layer Gateway, for providing network address translation means.

6. Process according to claim 1, wherein for the voice data transmission to the authentication server the Realtime Transport Protocol is used.

7. Process according to claim 1, wherein an URI is dedicated to the user data terminal for establishing the VoIP session, and the URI is used to address the authentication server.

8. Process according to claim 1, wherein the data network is an internet protocol based network and a client at the user terminal comprises a STUN client.

9. Process according to claim 1, wherein the first processing step (b) comprises at least one of voice quality processing or voice quality enhancement steps.

10. Process according to claim 3, wherein a password or user-ID spoken by the user is pre-processed by speech recognition.

11. Process according to claim 1, wherein the data network is a mobile network, and a mobile terminal is used as the user data terminal.

12. Arrangement for controlling the access of a user to a service provided in a data network, to protect user data stored in a data base of the service from unauthorized access, the arrangement comprising:

a user data terminal and an authentication server and at least temporary connections between the user data terminal and the authentication server and between the authentication server and a server of the service via the data network, wherein the user data terminal comprises:

speech input means for inputting a user's voice sample, and first processing means being connected to an output of the speech input means and comprising a dedicated client that outputs a pre-processed voice biometric sample or a current voice biometric profile, and the authentication server comprises:

second processing means being connected to an output of the first processing means and comprising comparator means for comparing the current voice biometric profile evaluated from the user's voice sample with an initial voice biometric profile stored in voice profile storage means, and signal/access control generation means being connected to an output of the second processing means, for outputting an access control signal to the server of the service.

13. Arrangement according to claim 12, comprising supplementary authentication means providing an output signal which is input into the access control signal generation means, for being processed together with the output signal of the comparator means.

14. Arrangement according to claim 13, wherein the supplementary authentication means is substantially implemented at the user data terminal or distributed over the user data terminal and the authentication server.

15. Arrangement according to claim 12, wherein the first processing means comprises at least one of voice quality processing means or voice quality enhancement means.

16. Arrangement according to claim 14, wherein the supplementary authentication means comprises speech recognition means for recognizing a password or user-ID, based on a speech input by the user.

17. Arrangement according to claim 12, wherein the user data terminal is a mobile terminal connected to a mobile network.

* * * * *